United States Patent [19]

Seidler et al.

[11] 3,979,413
[45] Sept. 7, 1976

[54] POLYCYCLIC DYESTUFFS

[75] Inventors: Helmut Seidler, Bonn-Bad Godesberg; Klaus Wunderlich, Leverkusen; Hans-Samuel Bien, Burscheid; Heinrich Leister, Leverkusen, all of Germany

[73] Assignee: Bayer Aktiengesellschaft, Leverkusen, Germany

[22] Filed: Oct. 17, 1974

[21] Appl. No.: 515,470

[30] Foreign Application Priority Data

Oct. 26, 1973 Germany............................ 2353700

[52] U.S. Cl. ............................................. 260/326.1
[51] Int. Cl.$^2$...................................... C07D 209/44
[58] Field of Search ................................. 260/326.1

[56] References Cited
UNITED STATES PATENTS 3,068,057  12/1962  Baumann..................... 260/326.1 X Primary Examiner—Frederick E. Waddell
Attorney, Agent, or Firm—Plumley & Tyner

[57] ABSTRACT

Polycyclic dyestuffs of the formula

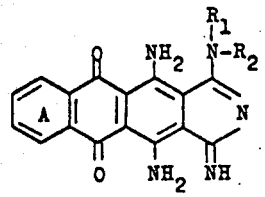

wherein $R_1$ and $R_2$ represent alkyl, cycloalkyl, aralkyl or aryl or together form a ring which is optionally interrupted by hetero-atoms and wherein both the benzene nucleus A and the said radicals $R_1$ and $R_2$ can carry non-ionic radicals customary in dyestuff chemistry, and their use for the dyeing of organic materials, especially synthetic fiber materials. Dyeings obtained show good general fastness properties.

8 Claims, No Drawings

POLYCYCLIC DYESTUFFS

The present invention relates to polycyclic compounds of the formula

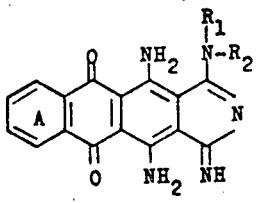

wherein
$R_1$ and $R_2$ represent alkyl, cycloalkyl, aralkyl or aryl or together form a ring which is optionally interrupted by hetero-atoms
and wherein
both the benzene nucleus A and the said radicals $R_1$ and $R_2$ can carry non-ionic radicals customary in dyestuff chemistry,
and to their preparation and use.

Suitable alkyl radicals $R_1$ and $R_2$ are those with 1–6 C atoms, which can optionally be substituted, preferably mono-substituted, by halogen, hydroxyl, nitrile, $C_1$–$C_4$-alkoxy, COOH or $C_1$–$C_4$-alkoxycarbonyl.

Suitable cycloalkyl radicals $R_1$ and $R_2$ are those with 5–7 ring members which can be substituted, for example by $C_1$–$C_4$-alkyl, halogen or OH; the cyclohexyl radical is preferred.

Suitable aralkyl radicals $R_1$ and $R_2$ are, above all, phenyl-$C_1$–$C_4$-alkyl radicals which can be substituted in the phenyl radical, preferably monosubstituted, disubstituted or trisubstituted, by halogen, $C_1$–$C_4$-alkyl, $C_1$–$C_4$-alkoxy, $C_1$–$C_4$-hydroxyalkyl and, preferably, OH; benzyl and phenylethyl are preferred.

Suitable aryl radicals $R_1$ and $R_2$ are, in particular, phenyl radicals, which can be substituted like the above-mentioned phenylalkyl radicals.

Suitable hetero-radicals which link $R_1$ and $R_2$ to one another are, for example, morpholine, thiomorpholine, piperidine or pyrrolidine.

Suitable substituents in the nucleus A are halogen, $C_1$–$C_4$-alkyl, $C_1$–$C_4$-alkoxy, nitro and others; Cl, $CH_3$ and $OCH_3$ are preferred.

Within the scope of the present invention, halogen is understood as F, Br and above all Cl.

Particularly preferred compounds of the formula I are those wherein $R_1$ and $R_2$ represent identical or different $C_1$–$C_6$-alkyl radicals, which are preferably substituted by OH, and those wherein $R_1$ represents a $C_1$–$C_6$-alkyl radical which is preferably substituted by OH, and $R_2$ denotes phenyl or cyclohexyl, in which the phenyl or cyclohexyl ring can be substituted, preferably by methyl.

The new compounds can be prepared, for example, by reacting 3-imino-4,7-diamino-5,6-phthaloyl-isoindolenines (II)

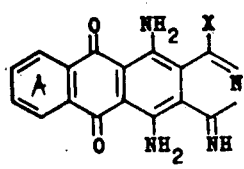

which carry a replaceable substituent X in the 1-position, with amines of the formula $HNR_1R_2$.

Suitable replaceable substituents X are $C_1$–$C_4$-alkoxy or $C_1$–$C_4$-alkylmercapto radicals; $OCH_3$ is preferred.

The starting materials II are known or can be prepared according to known methods (compare, for example, German Pat. No. 1,073,131).

Suitable amines $HNR_1R_2$ are: dimethylamine, diethylamine, di-n-propylamine, diisopropylamine, di-n-butylamine, diisobutylamine, diallylamine, methyl-2-hydroxyethylamine, ethyl-2-hydroxyethylamine, phenyl-2-hydroxyethylamine, bis-2-hydroxyethylamine, 2-hydroxyethyl-3-hydroxypropylamine, bis-2-hydroxypropylamine, bis-2-methoxyethylamine, methyl-2-cyanoethylamine, 2-hydroxyethyl-2-cyanoethylamine, 2-methoxyethyl-2-cyanoethylamine, bis-2-cyanoethylamine, methylcyclohexylamine, 2-hydroxyethylcyclohexylamine, N-methylaniline, N-ethylaniline, N-2-hydroxyethylaniline, N,N'-dimethylethylenediamine, morpholine, thiomorpholine, piperidine and pyrrolidine.

The reaction of the compounds II with the secondary amines is suitably carried out in organic solvents which are inert under the reaction conditions, or in excess amine as the diluent, at temperatures of 20° to 150°C, preferably of 20° to 70°C.

Suitable solvents are lower aliphatic alcohols, preferably methanol; ethers, such as dioxane and tetrahydrofurane; acid amides and lactams, such as dimethylformamide and N-methylpyrrolidone; sulphoxides, such as dimethylsulphoxide; nitrobenzene, and many others.

The new dyestuffs are suitable for dyeing organic materials, especially synthetic fibre materials, such as fibre materials of polyamide, polyacrylonitrile, polyesters and cellulose esters, such as cellulose triacetate, in accordance with the methods of dyeing customary for these types of fibres.

Very particularly, the dyestuffs I are suitable for dyeing the said fibre materials from organic solvents, preferably water-immiscible solvents, in accordance with the known exhaustion processes, especially for polyester and cellulose triacetate materials.

Suitable organic solvents are, above all, aliphatic and aromatic halogeno-hydrocarbons with boiling ranges of 60° to 180°C, preferably 80° to 130°C.

Tetrachloroethylene, trichloroethylene and 1,1,1-trichloroethane have proved particularly suitable. Mixtures of these solvents can also be used.

The dyeing liquors can contain small amounts, that is to say up to 1 percent by weight, and preferably 0.5 percent by weight, of water, based on the weight of the organic solvents.

Preferably, however, an addition of water is dispensed with.

Since the new dyestuffs are very sparingly soluble or even insoluble in the solvents mentioned, it is advisable to employ the dyestuffs in a finely divided form, together with commercially available, preferably non-ionic, dispersing agents, which are used in amounts of 0.05 to 2 percent by weight, based on the solvent.

The preferred dyeing process according to the invention is, in particular, carried out in closed apparatuses, for example by introducing the fibre materials into the dye bath at room temperature, using liquor ratios of, preferably, 1:5 to 1:20, heating the dye bath to the desired dyeing temperature and keeping it at this temperature until the desired depth of colour has been reached or the liquor is exhausted. After cooling to room temperature, the liquor is separated off and the fibre materials are dried, optionally after brief rinsing with fresh organic solvent.

Using the preferred process according to the invention provides a simple way of dyeing synthetic fibre materials with high dyestuff yields and good general fastness properties.

The parts mentioned in the examples which follow are by weight, unless stated otherwise.

EXAMPLE 1

100 parts of a fabric of texturised polyethylene terephthalate fibres are introduced, without prior cleaning, into a dye bath at room temperature, which has been prepared from 1 part of 1-(methyl-2-hydroxyethylamino)-3-imino-4,7-diamino-5,6-phthaloylisoindolenine (1)

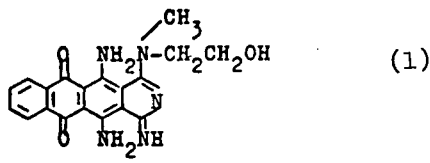

and 1,000 parts of tetrachloroethylene. The bath is heated to 115°C over the course of 10 minutes, with vigorous circulation of the liquor, and is kept at this temperature for 30 minutes. The liquor is then separated off and the dyed goods are rinsed with fresh solvent at about 40°C for 5 minutes. After separating off the rinsing liquor, the dyed goods are centrifuged and dried in a stream of air. A strong blue dyeing with good fastness to sublimation, washing, rubbing and light is obtained.

An equivalent blue dyeing is obtained, in the same manner, on a fabric of polycyclohexanedimethylene terephthalate fibres.

If the tetrachloroethylene is replaced by the same quantity of 1,1,2-trichloroethane, an equivalent dyeing is obtained.

The dyestuff (1) employed is prepared as follows: 10 parts of 1-methoxy-3-imino-4,7-diamino-5,6-phthaloyl-iso-indolenine in 50 parts of methyl-2-hydroxyethylamine are stirred at 50°C until a sample withdrawn from the reaction mixture and examined chromatographically indicates complete conversion. The reaction mixture is then introduced into 400 parts of water and adjusted to pH 8 by dropwise addition of concentrated hydrochloric acid, whilst stirring. The dyestuff is sucked up and washed with water and methanol. The yield after drying is 10 parts.

EXAMPLE 2

100 parts of a fabric of triacetate fibres are introduced into a dye bath at room temperature, which has been prepared from 1 part of 1-(bis-2-hydroxyethylamino)-3-imino-4,7-diamino-5,6-phthaloylisoindolenine (2)

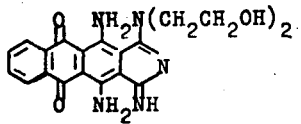

and 1,000 parts of tetrachloroethylene. The bath is heated to 110°C over the course of 20 minutes, with vigorous circulation of the liquor, and is kept at this temperature for 45 minutes. The liquor is then separated off and the fabric is rinsed with fresh tetrachloroethylene at 40°C. After separating off the rinsing liquor, the dyed goods are freed from the adhering solvent by centrifuging, and drying in a stream of air. A blue dyeing of good general fastness properties, especially excellent fastness to light, is obtained.

If the 1,000 parts of tetrachloroethylene are replaced by the same amount of 1,1,2-trichloroethane, 1,1,1,2-tetrachloroethane, 1,1,2,2-tetrachloroethane, pentachloroethane, 1,2-dichloropropane, 2-chlorobutane, 1,4-dichlorobutane, chlorobenzene or chlorotoluene, equivalent dyeings are obtained.

The dyestuff (2) which is employed is prepared as follows: 10 parts of 1-methoxy-3-imino-4,7-diamino-5,6-phthaloyl-isoindolenine are suspended in 60 parts of N-methyl-pyrrolidone. After adding 30 parts of bis-2-hydroxyethylamine, the reaction mixture is stirred for 12 hours at 50° and then introduced into 1 liter of water, and solid sodium chloride is added, whilst stirring, until the reaction product has precipitated completely. After filtration, washing with water and methanol and drying, 11.3 parts of dyestuff are obtained.

EXAMPLE 3

100 parts of cellulose 2½-acetate yarn are introduced into a dye bath at approx. 22°C, which has been prepared from 1 part of the dyestuff used in Example 1, 1,000 parts of tetrachloroethylene, 1.5 parts of oleic acid ethanolamide, 1.5 parts of oleyl alcohol heptaethylene glycol ether and 5 parts of water. The bath is warmed to 78°C over the course of 20 minutes and is kept at this temperature for 45 minutes. After separating off the dyeing liquor and rinsing with fresh tetrachloroethylene, the dyed goods are freed from the adhering solvent by suction, and drying in a stream of air. A blue dyeing with good fastness properties is obtained.

EXAMPLE 4

100 parts of polyacrylonitrile fibre yarn are dyed in a bath which has been prepared as described in Example 3. The bath is heated to 100°C over the course of 20 minutes and is kept at this temperature for 30 minutes. After the customary washing and drying, a blue dyeing of good fastness properties is obtained.

EXAMPLE 5

100 parts of poly-ε-caprolactam fibre yarn are introduced into a dye bath at room temperature, which contains 1 part of 1-(bis-2-hydroxypropylamino)-3-imino-4,7-diamino-5,6-phthaloylisoindolenine (3)

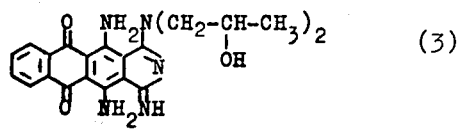

in 1,000 parts of tetrachloroethylene. The bath is warmed to 100°C over the course of 20 minutes whilst vigorously circulating the liquor and is kept at this temperature for 40 minutes. After this time, the liquor is separated off and the dyed goods are briefly rinsed with fresh solvent and dried, after centrifuging, in a stream of air. A blue dyeing with good fastness properties is obtained.

An equivalent dyeing is also obtained on yarns of polyhexamethylenediamine adipate fibres.

The depth of colour of the dyeing can be increased by adding 1 part of oleic acid ethanolamide, 1 part of oleyl alcohol heptaethylene glycol ether and 4 parts of water to the dye bath.

The dyestuff used is obtained as described in Example 2, using a corresponding amount of bis-2-hydroxypropylamine instead of bis-2-hydroxyethylamine.

Further valuable dyestuffs of the formula I are obtained when the amines listed in the table which follows are used. For example, the dyestuffs obtained, when used in accordance with the dyeing process described above, give blue colour shades on polyethylene terephthalate fabrics:

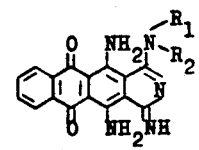    I

Table

| Dyestuffs of the formula I | | | |
| --- | --- | --- | --- |
| Example | Amine HNR$_1$R$_2$ employed | —NR$_1$R$_2$ | A |
| (6) | Dimethylamine | —N(CH$_3$)$_2$ | unsubstituted |
| (7) | Diethylamine | —N(CH$_2$CH$_3$)$_2$ | " |
| (8) | Di-n-propylamine | —N(CH$_2$CH$_2$CH$_3$)$_2$ | " |
| (9) | Diisopropylamine | —N[CH(CH$_3$)$_2$]$_2$ | " |
| (10) | Di-n-butylamine | —N[(CH$_2$)$_3$CH$_3$]$_2$ | " |
| (11) | Diisobutylamine | —N[CH$_2$CH(CH$_3$)CH$_3$]$_2$ | " |
| (12) | Diallylamine | —N(CH$_2$CH=CH$_2$)$_2$ | " |
| (13) | 2-Hydroxyethyl-3-hydroxypropylamine | —N(CH$_2$CH$_2$OH)(CH$_2$CH$_2$CH$_2$OH) | " |
| (14) | Bis-2-methoxyethylamine | —N(CH$_2$CH$_2$OCH$_3$)$_2$ | " |
| (15) | 2-Hydroxyethyl-2-cyanoethylamine | —N(CH$_2$CH$_2$OH)(CH$_2$CH$_2$CN) | " |
| (16) | 2-Methoxyethyl-2-cyanoethylamine | —N(CH$_2$CH$_2$OCH$_3$)(CH$_2$CH$_2$CN) | " |
| (17) | Bis-2-cyanoethylamine | —N(CH$_2$CH$_2$CN)$_2$ | " |
| (18) | Methylcyclohexylamine | —N(CH$_3$)(C$_6$H$_{11}$) | " |
| (19) | 2-Hydroxyethylcyclohexylamine | —N(CH$_2$CH$_2$OH)(C$_6$H$_{11}$) | " |
| (20) | N-Methylaniline | —N(CH$_3$)(C$_6$H$_5$) | " |
| (21) | N-Ethylaniline | —N(C$_2$H$_5$)(C$_6$H$_5$) | " |
| (22) | N-2-Hydroxyethylaniline | —N(CH$_2$CH$_2$OH)(C$_6$H$_5$) | " |
| (23) | N,N'-Dimethylethylenediamine | —N(CH$_3$)(CH$_2$CH$_2$NHCH$_3$) | " |
| (24) | Methyl-2-cyanoethylamine | —N(CH$_3$)(CH$_2$CH$_2$CN) | " |
| (25) | Ethyl-2-hydroxyethylamine | —N(CH$_2$CH$_3$)(CH$_2$CH$_2$OH) | " |
| (26) | Phenyl-2-hydroxyethylamine | —N(CH$_2$CH$_2$OH)(C$_6$H$_5$) | " |
| (27) | Morpholine | —N(CH$_2$CH$_2$)$_2$O | " |
| (28) | Thiomorpholine | —N(CH$_2$CH$_2$)$_2$S | " |

Table -continued

| | | Dyestuffs of the formula I | |
|---|---|---|---|
| Example | Amine $HNR_1R_2$ employed | $-NR_1R_2$ | A |
| (29) | Piperidine |  | " |
| (30) | Pyrrolidine |  | " |
| (31) | Diethylamine | $-N(C_2H_5)$ | 6,7-dichloro |
| (32) | " | " | 5,8-dichloro |

We claim:
1. A compound of the formula

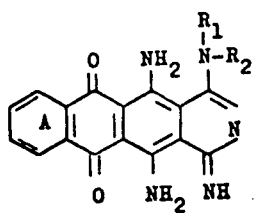

wherein
$R_1$ and $R_2$ are $C_1-C_6$-alkyl, cyclohexyl, $C_1-C_4$-alkylcyclohexyl, halocyclohexyl, hydroxycyclohexyl, phenyl-$C_1-C_4$-alkyl, halophenyl-$C_1-C_4$-alkyl, $C_1-C_4$-alkylphenyl-$C_1-C_4$-alkyl, $C_1-C_4$-alkoxyphenyl-$C_1-C_4$-alkyl, $C_1-C_4$-hydroxyalkylphenyl-$C_1-C_4$-alkyl, hydroxyphenyl-$C_1-C_4$-alkyl, phenyl, halophenyl, $C_1-C_4$-alkylphenyl, $C_1-C_4$-alkoxyphenyl, $C_1-C_4$-hydroxyalkylphenyl, hydroxyphenyl, or $C_1-C_6$alkyl substituted by halogen, hydroxy, cyano, $C_1-C_4$-alkoxy, —COOH, or $C_1-C_4$-alkylcarbonyl; and
A is unsubstituted as shown in the above formula or is substituted by halogen, $C_1-C_4$-alkyl, $C_1-C_4$-alkoxy, or nitro.

2. Compound of claim 1 wherein $R_1$ and $R_2$ are $C_1-C_6$-alkyl or $C_1-C_6$-alkyl substituted by halogen, hydroxy, cyano, $C_1-C_4$-alkoxy, —COOH, or $C_1-C_4$-alkylcarbonyl.

3. Compound of claim 1 wherein $R_1$ is $C_1-C_6$-alkyl substituted by halogen, hydroxy, cyano, $C_1-C_4$-alkoxy, —COOH, or $C_1-C_4$-alkylcarbonyl; and
$R_2$ is cyclohexyl, $C_1-C_4$-alkylcyclohexyl, halocyclohexyl, hydroxycyclohexyl, phenyl, halophenyl, $C_1-C_4$-alkylphenyl, $C_1-C_4$-alkoxyphenyl, $C_1-C_4$-hydroxyalkylphenyl, or hydroxyphenyl.

4. Compound of claim 2 wherein $R_1$ and $R_2$ are $C_1-C_6$-hydroxyalkyl and A is unsubstituted.

5. Compound of claim 3 wherein
$R_1$ is $C_1-C_6$-hydroxyalkyl;
$R_2$ is phenyl, cyclohexyl, methylphenyl, or methylcyclohexyl; and
A is unsubstituted.

6. Compound of claim 2 wherein
$R_1$ is —$CH_3$;
$R_2$ is —$CH_2CH_2OH$; and
A is unsubstituted.

7. Compound of claim 4 wherein
$R_1$ and $R_2$ are —$CH_2CH_2OH$.

8. Compound of claim 5 wherein
$R_1$ is —$CH_2CH_2OH$ and
$R_2$ is cyclohexyl.

* * * * *